United States Patent [19]

Krauss et al.

[11] Patent Number: 4,596,512
[45] Date of Patent: Jun. 24, 1986

[54] CIRCULATION CONTROLLED ROTOR BLADE TIP VENT VALVE

[75] Inventors: Timothy A. Krauss, Harwinton; Donald R. Carter, Sr., Derby, both of Conn.

[73] Assignee: United Technologies Corporation, Hartford, Conn.

[21] Appl. No.: 644,002

[22] Filed: Aug. 23, 1984

[51] Int. Cl.[4] .............................................. B64C 11/24
[52] U.S. Cl. ................................. 416/42; 416/90 A; 415/DIG. 1
[58] Field of Search ............... 416/20 R, 20 A, 90 A, 416/90 R, 42, 92; 415/DIG. 1; 244/207

[56] References Cited

U.S. PATENT DOCUMENTS

| | | | |
|---|---|---|---|
| 2,885,160 | 5/1959 | Griswold, II | 244/207 |
| 3,005,496 | 10/1961 | Nichols | 416/90 A |
| 3,062,483 | 11/1962 | Davidson | 416/90 A |
| 3,588,273 | 6/1971 | Kizilos | 416/20 R |
| 3,689,173 | 9/1972 | Morton | 416/90 A |
| 3,887,146 | 6/1975 | Bright | 244/207 |
| 3,964,838 | 6/1976 | Spargo | 416/20 R |
| 4,117,995 | 10/1978 | Runge | 244/207 |
| 4,507,050 | 3/1985 | Jeffery et al. | 416/90 A |

FOREIGN PATENT DOCUMENTS 1158312  7/1969  United Kingdom ............... 244/207

*Primary Examiner*—Robert E. Garrett
*Assistant Examiner*—H. Edward Li
*Attorney, Agent, or Firm*—Gerald E. Linden

[57] ABSTRACT

Inadvertent slot opening in a circulation controlled rotor due to plenum valve leakage is averted by venting duct pressure below a control minimum. A vent valve is disclosed.

2 Claims, 2 Drawing Figures

U.S. Patent  Jun. 24, 1986  4,596,512
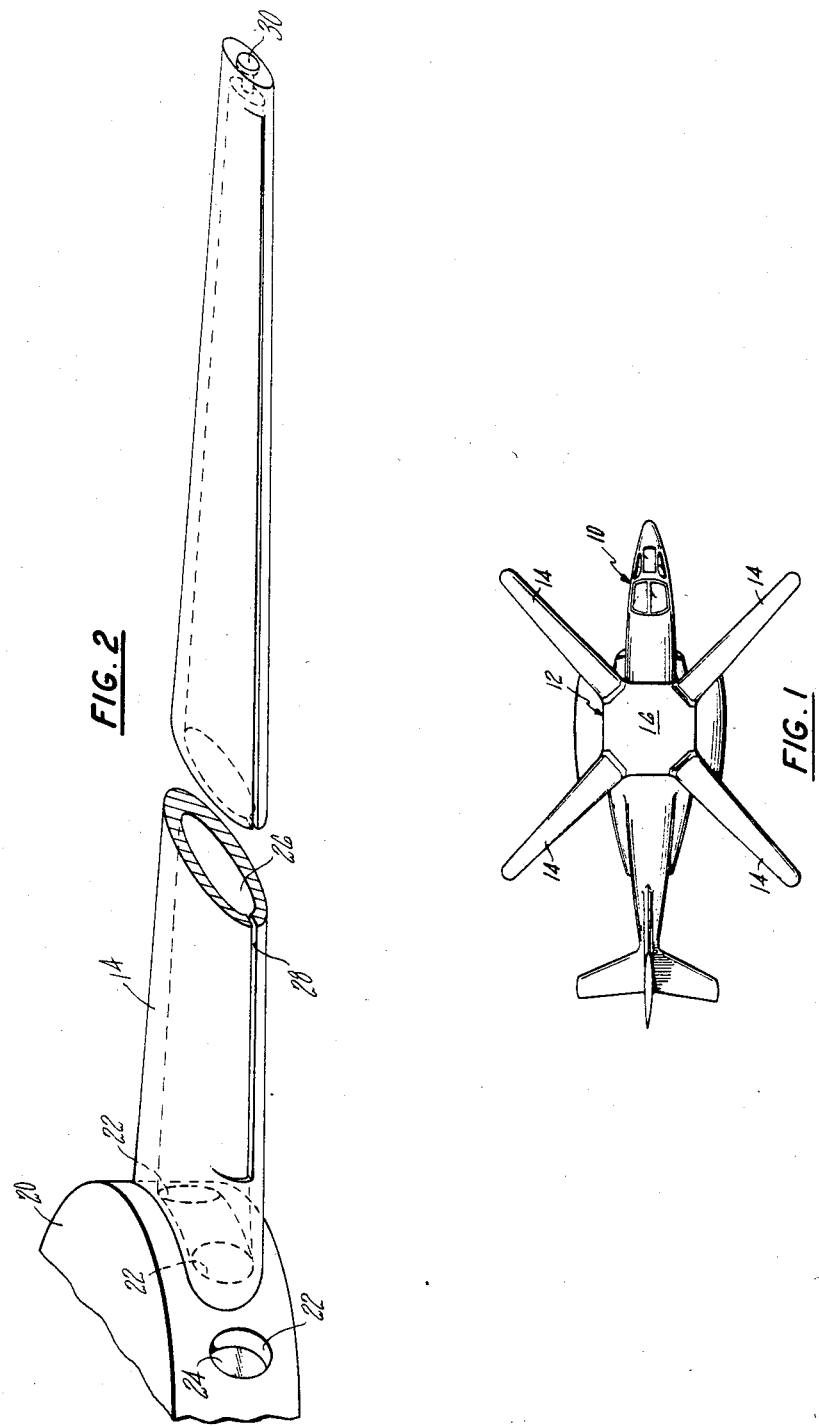

CIRCULATION CONTROLLED ROTOR BLADE TIP VENT VALVE

The invention described herein was made in the performance of work under NASA Contract No. NAS 2-11771 and is subject to the provisions of Section 305 of the National Aeronautics and Space Act of 1958 (72 Stat. 435; 42 U.S.C. 2457.

DESCRIPTION

BACKGROUND OF THE INVENTION

A circulation controlled rotor such as the X-wing, achieves cyclic and collective pitch control by the programmed blowing of pressurized air through leading and trailing edge slots on the blades. The slots are preloaded in a closed position so that when no pressure is supplied to the blade duct, external aerodynamic suction will not cause the slot to open, which would create undesirable drag. The preload also insurres positive, full slot opening at a minimum control pressure which is greater than the preload.

A plenum supplies the pressurized air to the blades via a series of valves. In the case of valve leakage, some pressure may be supplied when none is commanded. This leakage may of itself, or in combination with the aerodynamic suction, cause the slot to open inadvertently.

DISCLOSURE OF THE INVENTION

Therefore, it is an object of this invention to prevent slot opening due to plenum valve leakage.

According to the invention, a vent valve is provided in the duct of a circulation controlled rotor to vent pressures below a minimum control pressure, such as would occur from plenum valve leakage, so that the slot does not open in response thereto. In conjunction with a slot preload, the vent valve closes at a threshold pressure which is at least the preload and less than the minimum control pressure.

Other objects, features and advantages of the invention will become more apparent in light of the following desription thereof.

BRIEF DESCRIPTION OF THE DRAWINGS

FIG. 1 is a top view of an X-wing aircraft 10; and

FIG. 2 is a perspective partial cutaway view of a plenum 20 and a blade 14 for the X-wing aircraft, showing the vent valve 30 of this invention.

BEST MODE FOR CARRYING OUT THE INVENTION

FIG. 1 shows an X-wing aircraft 10 having a rotor 12 including four blades 14 and a hub 16. The blades 14 are circulation controlled airfoils, each having leading edge and trailing edge slots through which compressed air from a pneumatic system is ejected. Control is obtained by cyclically and collectively modulating the amount of ejected airflow. In certain flight regimes, such as landing and take off, the rotor system rotates; and in other flight regimes, such as forward flight, the rotor system is stationary and locked in the position shown.

In FIG. 2 there is shown a section of an annular plenum chamber 20 about the outer circumference of which is disposed a series of openings 22 and associated valves 24. The plenum 20 is pressurized by an air compressor (not shown) and the valves 24 modulate the amount of air that flows through the openings 22. For no circulation control the valves 24 are fully closed and they open according to the amount of control commanded by a flight control system (not shown).

A blade 14 rotates about the plenum 20 to receive the pressurized air therefrom into a duct 26. The root end of the duct 26 may span two adjacent openings 22 in order to reduce transients. The pressurized air is ejected from the duct 26 through a leading or trailing edge slot 28 in the blade 14. Both leading and trailing edge slots and associated ducts may be provided, but only one is shown for descriptive simplicity. It should be understood that the blade 14 has structural elements that are not germane to this invention and consequently are not shown.

The slot 28 is preloaded in a closed position (but is shown open) so that aerodynamic suction does not cause it to open, which would create undesirable drag. For example, aerodynamic suction may be on the order of ONE psi. The slot preload corresponds to a value sufficiently higher than the suction, for instance THREE psi, to insure that suction will not open the slot. The minimum control pressure is sufficiently higher than the slot preload, for instance SIX psi, to insure positive slot opening and closing, despite slot hysteresis and variations in preload from slot to slot and along the length of a particular slot. In the control range of pressures, the slot is fully open and control is a function of pressure.

Consider the situation where ZERO control is commanded and there is leakage past the plenum valve 24 into the duct 26. Even though the leakage may be less than the preload, for instance TWO psi, it can combine with the aerodynamic suction (ONE psi) to open the slot 28 (THREE psi). Therefore, it is desirable to vent the leakage from the duct 26.

A vent valve 30 is provided in communication with the duct 26 to vent pressure therefrom to outside the blade. The valve 30 is biased, for instance by a spring, to close when the pressure reaches a threshold. The threshold is less than the minimum control pressure (SIX psi) so that control pressure is not vented. The threshold should be at least equal to the slot preload (THREE psi), because if it were less, for instance TWO psi, it would simply be redundant to the slot preload.

Thus, the threshold should be selected to be at least the preload pressure and less than the minimum control pressure. The hysteresis of the vent valve should also be considered. For instance, the vent valve 30 could fully close at FIVE psi and fully open at FOUR psi. In other words, the vent valve should close at a pressure that is less than the minimum control pressure and open at a pressure that is at least the slot preload. As to the selection of a particular valve design and its location in the duct, factors such as the gravitational (e.g., centrifugal) environment and aerodynamic suction forces on the vent valve itself need to be considered. It should be understood that the vent valve 30 may include a poppet, a disc, a ball, a flap, a diaphragm or any suitable mechanism that meets the above-prescribed requirements.

The invention has been shown with respect to an embodiment thereof. Various changes could be made therein and thereto without departing from the spirit and scope of the invention.

What is claimed is:

1. A circulation controlled rotor system, comprising: a pressurized air plenum;

plenum valves for modulating the release of air from the plenum;

a blade having an edge slot for circulation control;

a duct disposed in the blade for communicating air from the plenum valves to the edge slot; and valve means disposed in the duct for venting pressure from the duct in response to air pressure in the duct below a minimum control pressure.

2. A circulation controlled rotor system according to claim 1:

wherein the edge slot is preloaded closed at a slot preload pressure which is less than the minimum control pressure; and wherein the valve means vents pressure from the duct in response to air pressure in the duct in a range of pressures extending from at least the slot preload pressure to below the minimum control pressure.

* * * * *